United States Patent [19]

Rager

[11] Patent Number: 4,676,372
[45] Date of Patent: Jun. 30, 1987

[54] MAGNETIC DISC STORAGE CONTAINER

[76] Inventor: Robert Rager, 1908 Rainbow Dr., Silver Spring, Md. 20904

[21] Appl. No.: 759,165

[22] Filed: Jul. 26, 1985

[51] Int. Cl.$^4$ .............................................. B65D 85/57
[52] U.S. Cl. .................................. 206/45.23; 206/232; 206/425; 206/444; 211/40; 220/22; 312/193
[58] Field of Search ................ 206/232, 309, 425, 444, 206/45.2, 45.23; 220/22; 248/213.2, 205.1; 312/183, 185, 187, 188, 193; 211/40, 41, 81, 170

[56] References Cited

U.S. PATENT DOCUMENTS

| | | |
|---|---|---|
| D. 251,273 | 3/1979 | Egly . |
| D. 267,911 | 2/1983 | Long et al. . |
| 1,005,968 | 10/1911 | Hauser ............................ 206/45.23 |
| 1,118,184 | 11/1914 | Chappee ............................ 312/183 |
| 2,665,808 | 1/1954 | McAlister ............................ 220/22 |
| 2,807,355 | 9/1957 | Shiffman ............................ 206/45.2 |
| 3,556,620 | 1/1971 | Gutierrez ............................ 211/40 |
| 4,103,980 | 8/1978 | Silva ............................ 312/185 |
| 4,117,931 | 10/1978 | Berkman ............................ 211/40 |
| 4,162,006 | 7/1979 | Wilson . |
| 4,180,299 | 12/1979 | Tolerson ............................ 312/10 |
| 4,225,038 | 9/1980 | Egly . |
| 4,289,235 | 9/1981 | Egly . |
| 4,356,918 | 11/1982 | Kahle et al. . |
| 4,368,817 | 1/1983 | Temesvary . |
| 4,369,879 | 1/1983 | Egly et al. . |
| 4,401,216 | 8/1983 | Koch . |

FOREIGN PATENT DOCUMENTS

| | | | |
|---|---|---|---|
| 82/01810 | 6/1982 | PCT Int'l Appl. ................ 206/444 |
| 0373743 | 6/1932 | United Kingdom ................ 206/309 |
| 1158921 | 7/1969 | United Kingdom ............ 206/45.23 |

Primary Examiner—Joseph Man-Fu Moy
Assistant Examiner—Jimmy G. Foster
Attorney, Agent, or Firm—Spencer & Frank

[57] ABSTRACT

A magnetic disc storage container includes a base member having a bottom panel and four rows of guide rails which are disposed at an acute angle with respect to the bottom panel. All of the guide rails are parallel, and the guide rails within each row are equally spaced apart. Storage slots between the guide rails accommodate discs in two rows, the discs being supported in a stair-step manner so that identifying labels applied to the top borders of the discs are always visible. A transparent cover element is hinged to the container, and the disc labels are visible even when the cover element is closed. The cover element is releaseably lockable in its closed and opened positions. The base member is supported like an easel when the cover element is locked in its open position, thereby facilitating selection and use of the discs. Furthermore a molded-in ledge permits the container to be used as a copy holder when it is opened to its easel-stand position. An index card behind a transparent cover panel on the base member is used to assign storage positions for the discs.

19 Claims, 8 Drawing Figures

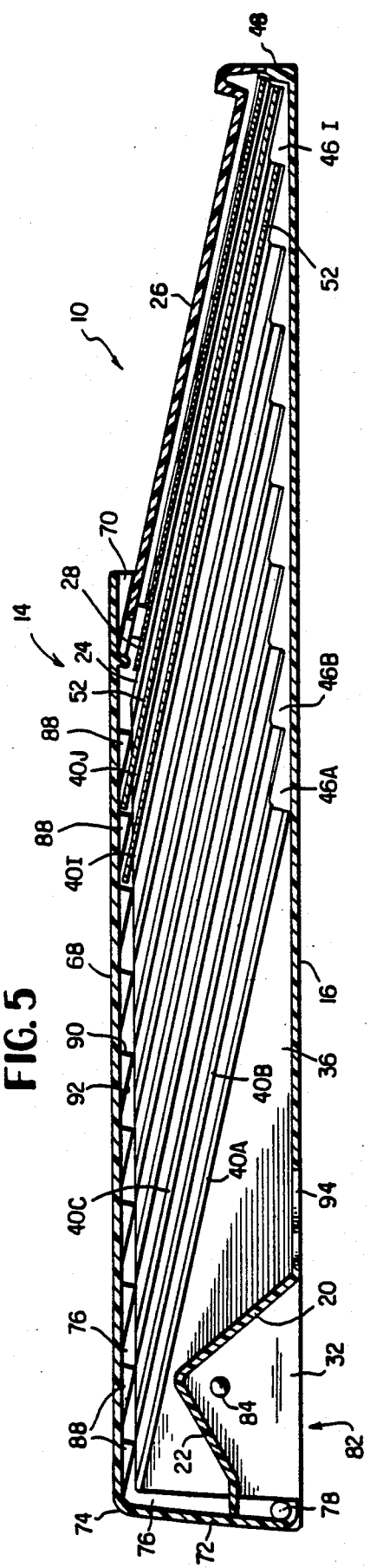
FIG. 5
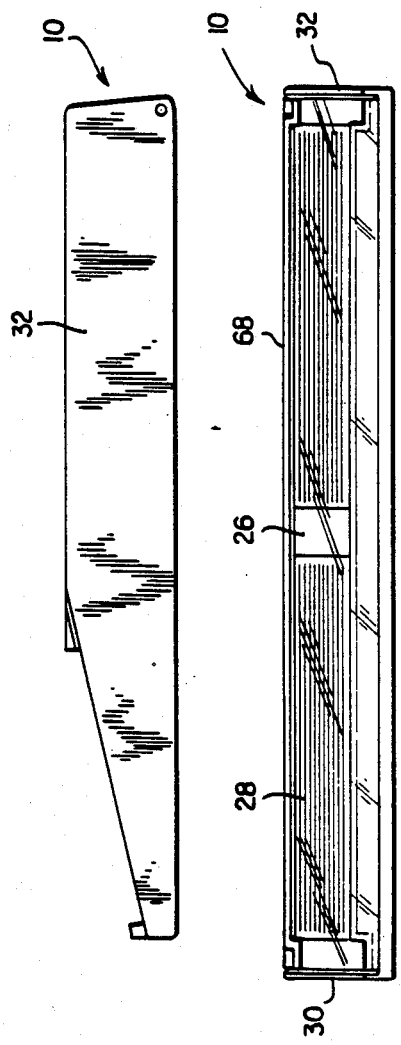
FIG. 6
FIG. 7
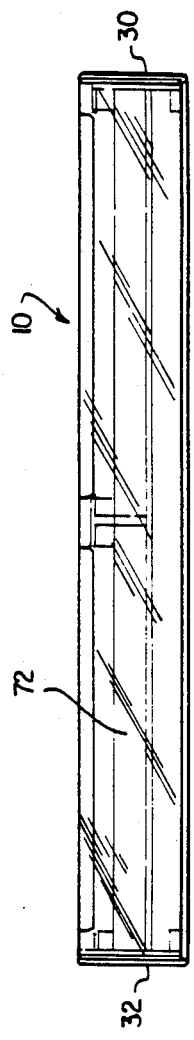
FIG. 8

MAGNETIC DISC STORAGE CONTAINER

BACKGROUND OF THE INVENTION

The present invention is related to a container for storing magnetic discs, and more particularly to a compact container having storage slots which receive the discs in a stair-step manner, so that the identifying label at the top of each disc is always visible.

Magnetic discs (sometimes known as "floppy disks" in order to distinguish them from hard discs) are frequently used with data processing equipment, such as computers or dedicated word processing machines, for storage of a large number of bits representing information. This information includes programs, such as disc operating systems, utilities programs, word processing programs, etc., and data that are used with such programs. For example a large number of discs might be used with a word processing program for chapters of a book or letters to customers.

A magnetic disc includes a circular sheet of plastic which is coated with a layer of magnetic material such as iron oxide particles. The circular sheet has a central aperture by which the sheet may be engaged by a disc drive to rotate the sheet. One or two magnetic read/write heads provided by the disc drive are moved across one or both surfaces of the plastic, as it rotates, in order to sense a stream of bits recorded in the magnetic layer or store a bit stream in the magnetic layer.

Due to the fragility of the magnetic layers, discs are permanently installed in protective jackets having circular apertures concentric with the central aperture in the plastic sheet and having elongated apertures so that the read/write heads can come into contact with the magnetic layers. These protective jackets may be hard or soft. The popular 5¼ inch disc, for example, employs a soft square permanent jacket which is frequently made of vinyl plastic sheet. It is common to use a label at the upper border or upper left-hand corner of such a permanent jacket to identify the disc contents. In addition to the permanent jackets, discs are usually sold with open-mouthed removable sleeves which cover the lower portions of the permanent jackets. The term "disc" will be used to refer to the combination of the coated plastic sheet and one or more "envelopes"; that is, the permanent protective jacket with or without a removable sleeve.

The recording medium of a disc remains susceptible to damage despite the envelopes. The apertures of the permanent jacket may allow grit to enter, and finger prints on the recording surface through the head apertures of the permanent envelope are also a source of trouble. The recording media may also be damaged by pressure received through the envelopes, as when a disk is on a cluttered desk beneath a paper which is written on with a ballpoint pen. This susceptibility to damage, plus the natural tendency to maintain a collection of discs together, has led to a variety of disk storage containers.

The typical disc storage container tends to be bulky, much like a container for index cards. With such a container the operator must thumb through the discs until he finds the one he wants. The problem is exacerbated because there is no convenient way to return a disc to its previous location after use, so that the position of a particular disc within the container is frequently changed.

SUMMARY OF THE INVENTION

One object of the present invention is to provide a disc storage container in which the discs are stored in a stair-step manner, so that the top portions of the discs are always visible.

Another object to the present invention is to provide a storage container which allows the disc labels to be visible at all times, regardless of whether the container is open or closed.

Another object of the present invention is to provide a storage container having storage slots for receiving discs and means for receiving indicia to assign each disc to a particular storage slot, the format of the means for receiving indicia corresponding to the arrangement of the storage slots in order to facilitate use.

Another object of the present invention is to provide a compact disc storage container having a transparent cover element which can be releaseably locked in a closed position or in an open position, in which open position the cover element supports the container in the manner of an easel.

Another object of the present invention is to provide a functional copy holder when the disc storage container is opened in the manner of an easel, thus facilitating data entry and word processing when such activities are the subjects of the magnetic discs in the computer. This is done by providing a molded ledge at the bottom of the index panel across its length.

These and other objects can be attained by providing a disc storage container which includes a base member having a bottom panel and having means defining a row of disc storage slots which store a row of discs parallel to one another and which are disposed at an acute angle with respect to the bottom panel, so that labels on the discs will always be visible, and a cover element which can be pivoted to open or close the container. The base member is preferably shallow, with four rows of guide rails extending angularly with respect to the bottom panel to provide two rows of storage slots, the bottom panel being provided with steps to support the bottoms of the discs. The base member preferably also includes a transparent cover panel behind which an index card can be received, the index card having left and right fields of spaces that are arranged in the same manner as the rows of storage slots. Preferably the cover element is transparent and includes step portions for retaining the discs in their respective slots during transportation, the cover element being releaseably lockable in a closed position or in an open position which props up the base member.

BRIEF DESCRIPTION OF THE DRAWINGS

FIG. 5 is a sectional view taken along the line 5—5 of FIG. 3.

FIG. 6 is a side elevational view of the container with the cover element in its closed position.

FIG. 7 is a front elevational view of the container with the cover element in its closed position.

FIG. 8 is a rear elevational view of the container with the cover element in the closed position.

DESCRIPTION OF THE PREFERRED EMBODIMENT

Figure 1:
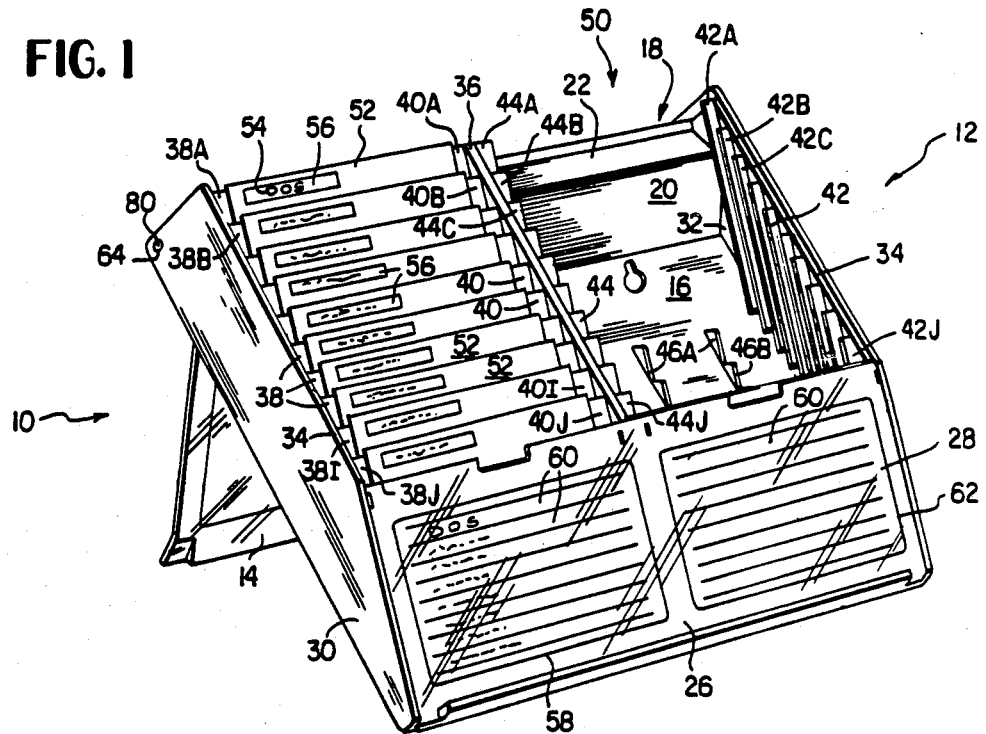
FIG. 1 is a perspective view of the magnetic disc storage container of the present invention, propped up in an upright position by the cover element, and illustrates discs in the storage slots of the left half of the base member.

With initial reference to FIG. 1, the magnetic disc storage container 10 of the present application includes a base member 12 and a transparent cover element 14 pivotably attached thereto. Base member 12 includes a bottom panel 16 and a rear wall 18 having a first portion 20 which slopes upward from panel 16 and a second portion 22 extending downward from the upper end of portion 20. Base member 12 also includes flanges 24 (see FIG. 5) and a transparent cover panel 26 spaced slightly in front of flanges 24, thereby providing space to slidably accommodate index card 28 between flanges 24 and panel 26. The use of index card 28 will be discussed in more detail in the following para- graphs.

With continuing reference to FIG. 1, base member 12 also includes left side wall 30 and right side wall 32, each having an upward flange 34 to impart increased rigidity to the structure. A centrally disclosed and upwardly extending divider element 36 is also included as part of base member 12 and is affixed to bottom panels 16 and rear wall 18.

With continuing reference to FIG. 1, the inner side of wall 30 is provided with ten parallel guide rails 38 which project slightly toward element 36. In the following discussion some of these guide rails 38 will be identified with alphabetical suffixes, and it will be noted that, in the drawings, the rear-most guide rail is identified with the suffix A, the next guide rail with the suffix B, and so on to guide rail 38I, which is just in front of the forward guide rail 38J. In a similar manner, the left side of divider wall or element 36 is provided with ten guide rails 40, which project slightly toward wall 30. Again, in the drawings the rear most guide rail is identified with reference number 40A, the next guide rail is identified with reference number 40B, and so on to the last two guide rails, 40I and 40J.

With continuing reference to FIG. 1, the right portion of base member 12 is configured just as the left portion, which has just been described. That is to say, right side wall 32 is provided with ten guide rails 42 (from guide rails 42A, 42B, and 42C at the back to guide rail 42J at the front) and the right side of divider element 36 is provided with ten corresponding guide rails 44 (from guide rails 44A and 42B at the back to guide rail 42J at the front).

The guide rails 38-44 are configured as identical, elongated rectangular elements which are angularly disposed with respect to bottom panels 16. They are affixed parallel to one another and, within each set, are equally spaced apart. That is to say, the distance between guide rails 42A and 42B is the same as the distance between the latter guide rail and rail 42C, and so on until 42J. Moreover all of the guide rails prefixed with the letter A (that is, guide rails 38A, 40A, 42A, and 44A) are disposed in a plane, all of the guide rails identified with the letter B are disposed in a plane that is parallel to the first plane, and so on to guide rails 38J, 40J, 42J, and 44J. Since the guide rails within each set are equally spaced, the planes are also equally spaced. Cover panel 26, it should be noted, is also parallel to the planes of guide rails 38-44.

With continuing reference to FIG. 1, bottom panel 16, on both the left and right halves thereof, is provided with ranks of upwardly projecting steps 46A, 46I. As will become apparent in the following discussion, a tenth step is unnecessary inasmuch as the front of base member 12 terminates in a tow region 48 (see FIG. 5).

Figure 3:
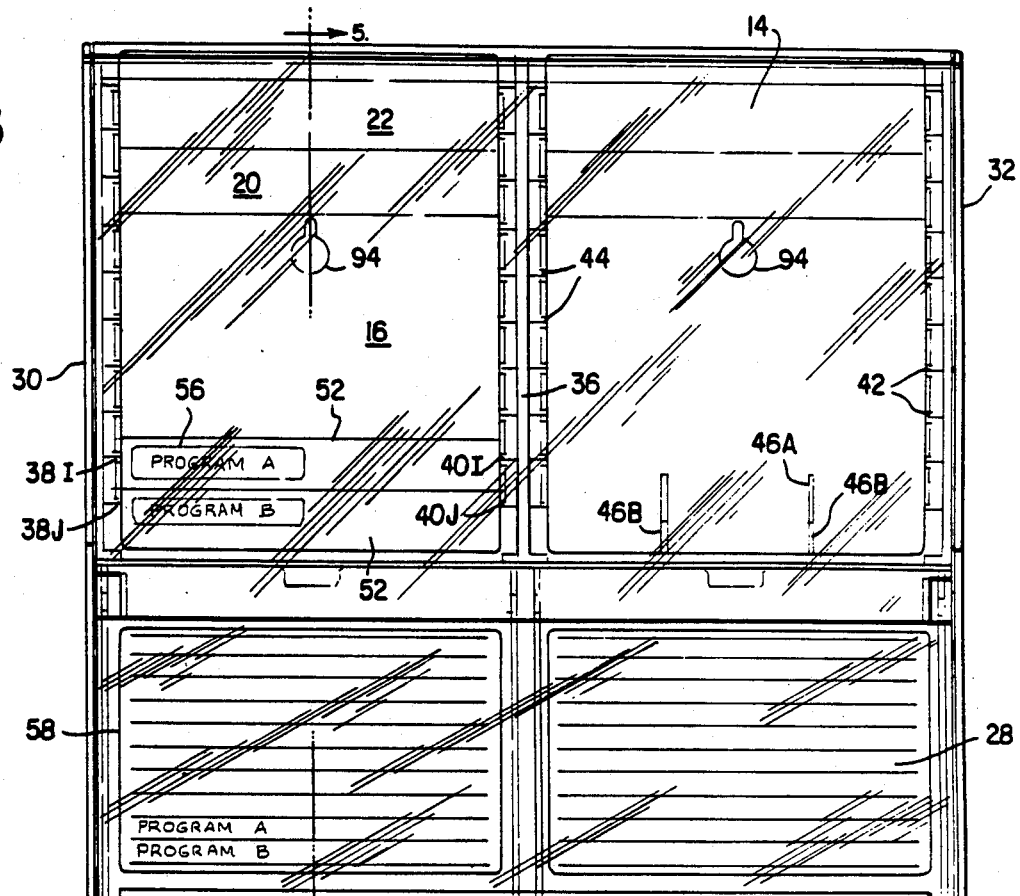
FIG. 3 is a top plan view of the container, with the cover element in its closed position.

Guide rails 38 and 40 provide a row of ten storage slots at the left of container 10 and guide rails 42 and 44 provide an additional row of ten storage slots at the right. Storage slot 50 at the right of container 10, for example, is provided in the region bounded by guide rail 42A, 42B, 44B, and 44A, and terminates downwardly at step 46A. In order to avoid cluttering the drawing, reference numbers have not been assigned to the remaining storage slots in container 10, but it will be apparent that the region bounded by guide rail 42B, 42C, 44B, and 42C and terminating downwardly at steps 46B, for example, represents another such storage slot. Each of these 20 storage slots is configured to removably accommodate a 5¼ inch floppy disc 52 (although it will be apparent that the dimensions of container 10 could readily be modified to receive other types of discs). As will be apparent from FIG. 1, the stair-step-like arrangement of these storage slots is such that the disc-identifying indicia 54 borne by the disc labels 56, which are attached to discs 52 at the upper borders thereof, can easily be observed without moving the discs. Although container 10 is illustrated in its propped-up position in FIG. 1, this readability would still be present if bottom panel 16 were resting flat on a work table, as in FIG. 3.

It is frequently desirable to store discs in a predetermined order, just as a mechanic might like to have his tools arranged in a certain way in order to facilitate his work. Maintaining a predetermined order would be no problem if container 10 were completely filled with 20 discs and the operator used but one disc at a time, returning that disc to the empty storage slot after use before withdrawing another disc. However many computer operations require that more than one disc be used at a time, and such multiple disc usage would create a problem when the discs are to be returned to their assigned storage slots after use. Moreover it is not uncommon for an operator to simply lay one disc aside when he is ready for other, so that a pile accumulates as he works. This stack of discs may be in a disordered state when the discs are returned to storage upon completion of the operator's project. Use of the index card 28 alleviates the problem of returning discs 52 to their assigned storage slots after use. In Figure 1 it will be noted that index card 26 is divided into a left field 58, having a space 60 corresponding to each of the ten storage slots in the left-hand portion of container 10, and a right field 62, which also has a space 60 corresponding to each storage slot. During use the operator simply refers to indicia marked in the spaces 60 to identify the assigned position of the corresponding disc 52. For example the top storage slot at the left-hand side of container 10— that is, the storage slot between guide rails 38A, 38B, 40A and 40B—is identified in the top space 60 of field 58. One of the features of container 10 is that the operator is able to identify, at a glance, any given disc regardless of its placement in the device. In such cases where disc order is constantly changing—but disc organization is still automatically maintained—then the index cards may be used to store reference information such as software commands or even telephone numbers, etc.

Base member 12 is preferably made of injection molded plastic components which are assembled after fabrication, in a manner known in the art, to provide a unitary structure to which cover element 14 is subsequently attached. To permit attachment of element 14, wall 30 is provided with a bore 64 (see FIG. 1) and wall 32 is provided with a corresponding bore 66 (see FIG. 2).

Turning next to FIG. 5, in section element 14 is essentially L-shaped, and includes a top panel portion 68, which terminates in flanges 70 to provide a releaseable, snap-action lock with base member 12, and a back portion 72, which is joined to top portion 68 at corner region 74. Cover element 14 is also provided with a pair of side flanges 76 to impart increased rigidity. Cover element 14 is preferably made of transparent injection molded plastic.

Figure 2:
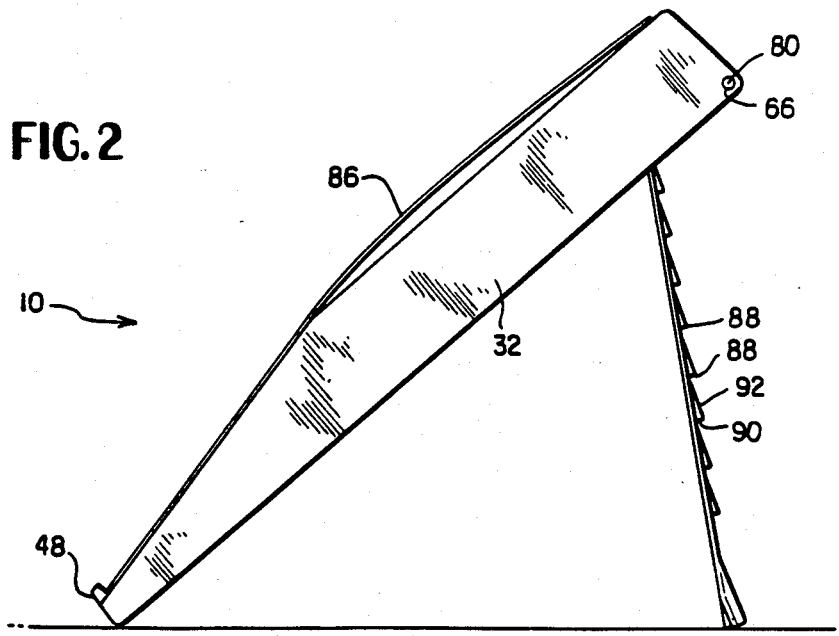
FIG. 2 is a side elevational view of the container in its open state, and illustrates the supplemental use of the container as a paper stand.
Figure 4:
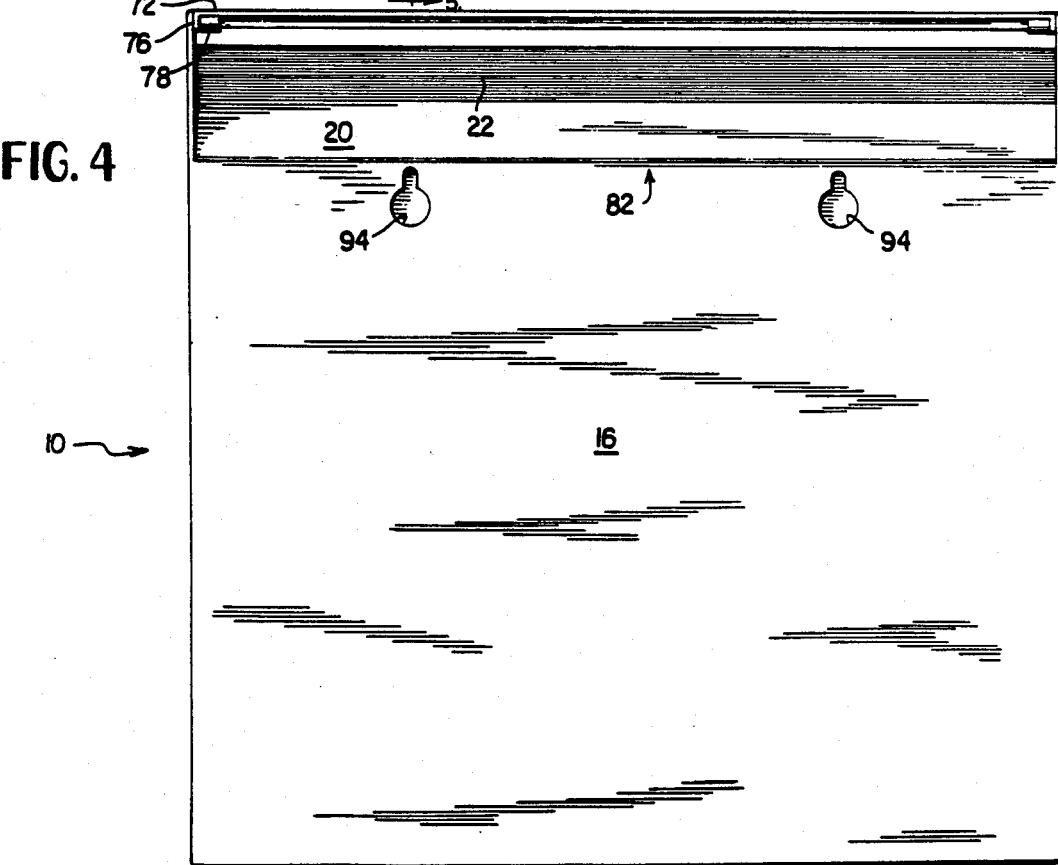
FIG. 4 is a bottom planned view of the container, with the cover element in its closed position.

With reference next to both FIGS. 4 and 5, a mounting peg 78 is molded into the plastic of cover 14 at each side of the bottom of back portion 72. Pins 80 (see FIGS. 1 and 2), projecting from pegs 78 and through side flanges 76, extend into bores 64 and 66 to pivotally mount cover element 14 to base member 12. As will be apparent from FIGS. 4 and 5, portions 20 and 22 of rear wall 18 provide a recess 82 in base member 12 to accommodate corner region 74 when cover element 14 is opened. Within recess 82, a detent 84 is molded into plastic of each of walls 30 and 32 (although only the detent 84 in wall 32 is illustrated in the drawings.) When container 10 is in its fully opened state, as illustrated in FIGS. 1 and 2, back portion 72 of cover element 14 bears against portion 20 of rear wall 18 and detents 84 engage side flanges 76 of cover element 14 to releaseably lock element 14 with respect to base member 12. In this locked position, container 10 may be used as a typing stand for supporting paper 86, as is illustrated in FIG. 2.

Returning to FIG. 5, a column of ten step portions 88 is molded into the plastic on either side of container 10. Portions 88 are generally triangular in configuration, each having a short side 90 and a long side 92. As will be apparent from FIG. 5, the long sides 92 are spaced closely to the discs 52 and are substantially parallel thereto when cover element 14 is closed, and accordingly do not distort the disc labels 56. Moreover the short sides 92 of the step portions 88 act as stoppers to reliably retain discs 52 in their respective storage slots when container 10 is moved. Were it not for this stopper function, the discs 52 might tend to slide out of their storage slots during rough handling of container 10 or when container 10 is turned upside down in its closed position, so that the top portions of discs 52 would pile up beneath cover element 14 and possibly force it open. In FIG. 5 it will be apparent that the stopper function for the last storage slot on the left (that is, the storage slot between guide rails 40A and 40B) is provided by corner region 74 of cover element 14, and that the last step portion 88 on the right does not perform the stopper function. Moreover the bottom support in the last storage slot on the right is provided by toe region 48 rather than a pair of steps 46.

The stair-step configuration of the storage slots provided by the guide rails of container 10 is particularly apparent from FIG. 5. Due to this stair step configuration, the top borders of the discs 52 within the storage slots are always visible, whether cover element 14 is closed as in FIG. 5 or open as in FIG. 1. Moreover the stair step configuration permits the discs 52 to be stored at an acute angle with respect to bottom panel 16, this angle preferably being about 15°. The acute storage angle allows container 10 to be compact in dimensions; in fact, container 10 is sized and dimensioned substantially as a notebook and can be stored among notebooks on a shelf. The container 10 is dimensioned to allow secure storage in any commercially available office furniture drawer. Furthermore the compact configuration allows container 10 to be hung on a wall, via screws through mounting holes 94 (see FIG. 3), with cover element 14 being temporarily put aside.

It will be understood that the above description of the present invention is susceptible to various modifications, changes, and adaptations, and the same are intended to be comprehended within the meaning and range of equivalents of the appended claims. For example, although the invention has been described with reference to magnetic discs, it will be apparent that other information-bearing discs, such as optical discs, could be used instead.

I claim:

1. A container for storing information-bearing discs having faces with borders to which labels can be applied, comprising:
   a base member having a bottom panel with inner and outer sides and having means defining a row of disc storage slots for storing a row of discs parallel to one another at spaced apart positions, each storage slot being disposed at an acute angle with respect to said bottom panel so that the border of a disc received therein cannot be entirely obscured by discs in other storage slots; and
   a transplant cover element having a top panel portion with inner and outer sides, said cover element being pivotably mounted on said base member and being movable between a closed position, wherein said storage slots are disposed between the inner sides of said bottom panel and said panel portion, and an open position, wherein the outer sides of said bottom panel and said panel portion face one another.

2. The container of claim 1, wherein said base member comprises a toe region, and means for releasably locking said cover element in said open position to prop said base member upon a supporting surface, with said toe region in contact with the supporting surface.

3. The container of claim 1, wherein said base member includes a transparent front panel which is oriented substantially parallel to said storage slots, and means for mounting an index card having a column of spaces to receive disc-identifying indicia behind said transparent front panel, with the index card being oriented by said means for mounting so that each space has a position corresponding to that of a respective storage slot.

4. The container of claim 1, wherein said means defining a row of storage slots comprises a plurality of first elongated guide rails, first means affixed to said bottom panel for mounting said first guide rails parallel to one another at spaced apart positions in a first row, a plurality of second guide rails, and second means affixed to said bottom panel for mounting said second guide rails parallel to one another at spaced apart positions in a second row that is parallel to and spaced apart from said first row.

5. The container of claim 4, wherein said first means comprises a side wall of said base member.

6. The container of claim 4, further comprising at least one row of step elements which are affixed to the inner side of said bottom panel between said first and second rows of guide rails and which are positioned to support discs received in said storage slots.

7. The container of claim 4, further comprising at least one row of step elements which are affixed to the inner side of said top panel portion of said cover element and which are positioned, when said cover element is in said closed position, between said first and second rows of guide rails.

8. The container of claim 7, wherein at least one step element of said top panel portion includes a first side disposed parallel to one storage slot and a second side disposed perpendicular to an adjacent storage slot, said second side providing means for limiting the motion of a disc in said adjacent storage slot.

9. The container of claim 4, wherein said bottom panel has at least one hole therein for mounting said container on a vertical surface.

10. The container of claim 4 wherein each of said first guide rails is in a respective common plane with a respective one of said second guide rails to define a respective one of said storage slots.

11. The container of claim 1, wherein said base member comprises a shallow container having a rear portion which defines an elongated recess, and wherein said cover element is generally L-shaped in cross section and has a corner region disposed between the two legs of the L, said cover being pivotably mounted at the rear portion of the container by means provided on the short leg of the L, the corner region of said cover extending into the elongated recess of said container when said cover member is in said open position.

12. The container of claim 11 wherein said container further includes a front panel which is oriented substantially parallel to said storage slots and whose upper edge engages said top panel of said cover element for releasably locking same in said closed position; and an elongated ledge extending along the lower edge of said front panel of said container and projecting above the outer surface of said front panel, whereby said container, when said cover element is in said open position, can function as a copy stand for papers supported on said ledge.

13. The container of claim 1, wherein said base member comprises means defining an additional row of said disc storage slots for storage of an additional row of discs parallel to one another at spaced apart positions, said row and additional row of storage slots being disposed laterally parallel to one another within said base member.

14. The container of claim 13, wherein said bottom panel is substantially flat and lies in a first plane; wherein said means defining a row of disc storage slots and said means defining an additional row of disc storage slots comprise guide rails, and walls extending substantially perpendicualrly from said bottom panel and having upper edges which lie substantially in a second plane that is substantially parallel to said first plane, with said guide rails being affixed parallel to one another on said walls; and wherein said base member further comprises a toe region adjacent said bottom panel, a substantially flat front panel extending from said toe region toward said second plane and having an elongated ledge extending outwardly from its surface adjacent said toe region, and means for releasably locking said cover element in said open position to prop said base member upon a supporting surface, with said toe region in contact with the supporting surface and with said ledge, front panel, and upper edges of said walls providing a copy holder for supporting papers.

15. A container for storing information-bearing discs having faces with borders to which labels can be applied, comprising:

a base member having a bottom panel with inner and outer surfaces, having means defining a row of disc storage slots for storing a row of discs parallel to one another at spaced apart positions, with each storage slot being disposed at an acute angle with respect to said bottom panel so that the border of a disc received therein cannot be entirely obscured by discs in other storage slots, and having a transparent front panel which is oriented substantially parallel to said storage slots, said means defining a row of storage slots including a plurality of first elongated guide rails, first means affixed to said bottom panel for mounting said first guide rails parallel to one another at spaced apart positions in a first row, a plurality of second guide rails, and second means affixed to said bottom panel for mounting said second guide rails parallel to one another at spaced apart positions in a second row that is parallel to and laterally spaced apart from said first row of guide rails, and with each of said first guide rails being in a respective common plane with a respective one of said second guide rails to define a respective one of said storage slots;

means for mounting an index card having a column of spaces to receive disc-identifying indicia behind said transparent front panel, with the index card being oriented by said means for mounting so that each space has a position corresponding to that of a respective storage slot; and a transparent cover, having a top panel portion with inner and outer surfaces, pivotably mounted on said base member and movable between a closed position, wherein said storage slots are disposed between said inner surfaces of said bottom panel and said top panel portion, and an open position.

16. A container for storing information-bearing discs having faces with borders to which labels can be applied, comprising:

a base member having a bottom panel with inner and outer surfaces, and having means defining a row of disc storage slots for storing a row of discs parallel to one another at spaced apart positions, with each storage slot being disposed at an acute angle with respect to said bottom panel so that the border of a disc received therein cannot be entirely obscured by discs in other storage slots, said means defining a row of storage slots including a plurality of first elongated guide rails, first means affixed to said bottom panel for mounting said first guide rails parallel to one another at spaced apart positions in a first row, a plurality of second guide rails, and second means affixed to said bottom panel for mounting said second guide-rails parallel to one another at spaced apart positions in a second row that is parallel to and laterally spaced apart from said first row of guide rails, and with each of said first guide rails being in a respective common plane with a respective one of said second guide rails to define a respective one of said storage slots;

at least one row of step elements which are affixed to said inner surface of said bottom panel between said first and second rows of guide rails and which are positioned to support discs received in said storage slots; and, a transparent cover, having a top panel portion with inner and outer surfaces, pivotably mounted on said base member and movable between a closed position, wherein said storage slots are disposed between said inner surfaces of said bottom panel and said top panel portion, and an open position.

17. The container of claim 16, further comprising means, affixed to said inner surface of said top panel portion of said cover and positioned, when said cover is in said closed position, between said first and second rows of spaced guide rails, for engaging the upper edges of any discs disposed in said storage slots to secure same in the respective said storage slots.

18. The container of claim 16 wherein: said base member includes further means defining a further row of said disc storage slots disposed parallel to but laterally displaced from said row of storage slots; said base member includes two parallel side walls and a third parallel wall symmetrically disposed between said side walls; said first means comprises one of said side walls; said second means comprises said third wall; and the elongated spaced rows of guide rails defining the respective storage slots of said further row of storage slots are mounted on said third wall and on the other said side walls of said base member.

19. A container for storing information-bearing discs having faces with borders to which labels can be applied, comprising:

a base member having a bottom panel with inner and outer surfaces, and having means defining a row of disc storage slots for storing a row of discs parallel to one another at spaced apart positions, with each storage slot being disposed at an acute angle with respect to said bottom panel so that the border of a disc received therein cannot be entirely obscured by discs in other storage slots, said means defining a row of storage slots including a plurality of first elongated guide rails, first means affixed to said bottom panel for mounting said first guide rails parallel to one another at spaced apart positions in a first row, a lurality of second guide rails, and second means affixed to said bottom panel for mounting said second guide rails parallel to one another at spaced apart positions in a second row that is parallel to and laterally spaced apart from said first row of guide rails, and with each of said first guide rails being in a respective common plane with a respective one of said second guide rails to define a respective one of said storage slots;

a transparent cover, having a top panel portion with inner and outer surfaces, pivotably mounted on said base member and movable between a closed position, wherein said storage slots are disposed between said inner surfaces of said bottom panel and said top panel portion, and an open position; and means, affixed to said inner surface of said top panel portion of said cover and positioned, when said cover is in said closed position, between said first and second rows of spaced guide rails, for engaging the upper edges of any discs disposed in said storage slots to secure same in the respective said storage slots, said means for engaging including a plurality of step elements, each associated with one of said storage slots, and with each said step element including a first side disposed parallel to one storage slot and a second side disposed perpendicular to an adjacent storage slot, with said second side providing means for limiting the motion of a disc in said adjacent storage slot.

* * * * *